United States Patent
Choi et al.

(10) Patent No.: US 7,269,395 B2
(45) Date of Patent: Sep. 11, 2007

(54) ENVELOPE DETECTION CIRCUIT FOR LOW POWER COMMUNICATION SYSTEMS

(75) Inventors: Yeung Bun Choi, Singapore (SG); Wooi Gan Yeoh, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 538 days.

(21) Appl. No.: 10/912,619

(22) Filed: Aug. 4, 2004

(65) Prior Publication Data

US 2006/0028342 A1    Feb. 9, 2006

(51) Int. Cl.
*H04B 17/00*    (2006.01)

(52) U.S. Cl. .................. 455/115.3; 455/226.2; 455/67.11

(58) Field of Classification Search .......... 455/67.11, 455/226.2, 115.3, 115.1, 127.1, 232.1, 126

See application file for complete search history.

(56) References Cited

U.S. PATENT DOCUMENTS

| | | | | |
|---|---|---|---|---|
| 4,620,114 A | * | 10/1986 | Moon | 327/58 |
| 4,890,066 A | * | 12/1989 | Straver et al. | 329/369 |
| 4,937,842 A | * | 6/1990 | Howell | 375/345 |
| 6,678,506 B1 | * | 1/2004 | Dolman et al. | 455/127.3 |
| 6,937,847 B2 | * | 8/2005 | Ehrenreich et al. | 455/115.1 |
| 2003/0203725 A1 | * | 10/2003 | Cowley et al. | 455/150.1 |
| 2004/0203543 A1 | * | 10/2004 | Regev | 455/127.1 |

FOREIGN PATENT DOCUMENTS

| JP | 61231464 | 4/1985 |
|---|---|---|
| JP | 06303037 | 4/1993 |
| WO | WO00/16283 | 3/2000 |

OTHER PUBLICATIONS

Karthaus et al., Fully Integrated Passive UHF RFID Transponder IC with 16.7-μ W Minimum RF Input Power, 38 IEEE Journal of Solid-State Circuits, 1602 (Oct. 10, 2003).
Friedman et al., A Low-Power CMOS Integrated Circuit for Field-Powered Radio Frequency Identification Tags, 1997 IEEE International Sold-State Circuits Conference, 294, 295, 474 (1997).

* cited by examiner

*Primary Examiner*—Edward F. Urban
*Assistant Examiner*—Blane J. Jackson
(74) *Attorney, Agent, or Firm*—Niky Economy Syrengelas, Esq.; K. David Crockett, Esq.; Crockett & Crockett

(57) ABSTRACT

An envelope detection circuit includes a signal rectifier, first and second capacitors, and first, second and third transistors. The signal rectifier includes an input port coupled to receive a modulated input signal, and an output port. The first capacitor has a first port coupled to the output port of the signal rectifier and a second port for coupling to a signal ground. The first transistor has a first port coupled to the output port of the signal rectifier, a second port for coupling to a signal ground, and a control port. The second transistor has a first port for coupling to a power supply, a second port, and a control port coupled to the output of the signal rectifier. The third transistor has a first port coupled to second port of the second transistor, a second port for coupling to a signal ground, and a control port. The second capacitor has a first port coupled to first port of the third transistor, and a second port for coupling to a signal ground.

22 Claims, 3 Drawing Sheets

ENVELOPE DETECTION CIRCUIT FOR LOW POWER COMMUNICATION SYSTEMS

BACKGROUND

The present invention relates to envelope detection circuitry, more particularly to envelope detection circuitry for use in low power communication devices employing amplitude modulation scheme.

Low power, high fidelity amplitude modulated receivers are used in numerous systems, such as portable AM radio receivers, two way radios, and remote control devices, telemetry radios and the like. Such portable devices typically operate on very little power in order to extend their usage, and accordingly require minimal power consumption during both signal demodulation and standby mode operation when no input signal is detected.

Radio frequency identification (RFID) represents another system in which amplitude modulated signals are used to remotely communicate information. As known in the art, RFID systems can be used in asset tracking and inventory management systems in which RFID tags (i.e., small RFID transceivers) may be place on an asset, and the asset's location monitored. RFID systems typically employ an On-Off Keying (OOK)/Amplitude-Shift Keying (ASK) based modulation scheme for down-link communications (from an RFID Reader/central station to the RFID tag) due to the simplicity in implementing the required receiver hardware. This modulation scheme alters the Reader output field strength as a way to convey information to the RFID tag. At the time when the radio field is reduced or completely cut-off, the RFID tag has to survive a momentary dip in field strength by preferably relying on stored charge in a capacitor to provide the needed DC power supply. While this process is advantageous in complementing battery-supplied power in "active" RFID tags, it becomes particularly important for "passive" RFID tags which do not include an on-board battery. Power is obtained from the radio field typically by rectifying the received radio wave into a supply voltage used to power the RFID tag and storing charge within a capacitor for powering the RFID tag over a short duration when the radio field has been reduced or cut-off due to downlink communication bit streams.

By sharing the same radio field with the communication channel, the ASK/OOK modulation scheme results in ripples on the power rectified output. Ripples on the rectified supply VDD can be detrimental to the functioning of the RFID tag circuitry. VDD ripples can be reduced by (i) increasing the capacitor size, (ii) decreasing the modulation index, (iii) increasing the data rate, or (iv) increasing the duty ratio.

Increasing the capacitor size is effective in smoothing out VDD ripple. However, a large capacitor would take up a significant amount of space, and if fabricated on an integrated circuit, would consume a significant amount of area and decrease IC yield. Decreasing the modulation index requires complex demodulation circuitry, and would be sensitive to environmental perturbations. Increasing the data rate or duty ratio has the same effect of reducing the time gap where the radio field is reduced or cut-off. While VDD ripples can be minimized by reducing the time gap for power dip, it also requires a high speed detector to trace the envelope of the fast changing signal. Power consumption of such envelope detector becomes a major concern as data rate or duty ratio increases.

FIG. 1 illustrates one approach for demodulating an OOK/ASK modulated signal from a received RFID radio field consisting of an envelope detector employing a rectifier circuit 110, with the same/similar architectures being employed in other amplitude modulated, low power receivers. A received modulated signal 105 is supplied to the signal rectifier 110, which produces the demodulated baseband signal 115. Capacitor $C_1$ functions as a short circuit at radio frequency (RF) to filter out the RF carrier and its value is primarily determined by the carrier frequency. Depending upon the implementation, $R_1$ can be replaced with a current sink transistor or multiple current sinks to drain the charge at $V_x$. The demodulated baseband signal $V_x$ 115 is further converted into binary level data2bb by a low frequency comparator 120 or equivalent functional block. When $V_x$ drops by a minimum falling threshold and reaches the reference value-ref, the comparator 120 output a binary 0. On the other hand, when $V_x$ rises above the reference value-ref, the comparator output a binary 1.

FIG. 2 illustrates the signal waveforms at various nodes of envelope detection 100, with features of the FIG. 1 being retained. Shown are the envelope of the modulated signal 105 at the input, the rectified signal $V_x$ 115, the demodulated baseband signal data2bb 202, and the power supply signal VDD 204. The rectified signal $V_x$ 115 tracks the rise of the RF envelope 105, with falling characteristic set by $R_1$ and $C_1$. The asymmetrical rise time and fall time of $V_x$ 115 results in reduction 206 of low period of the demodulated baseband signal data2bb 202, as shown. Fidelity of the demodulated baseband signal 202 can be improved by sharpening the falling characteristic of $V_x$ where $V_x$ drops from its peak value to the reference value-ref. This can be achieved by reducing $R_1$ or increasing the current drain at $V_x$. This, in turn increases the loading of the RF port through the signal rectifier 110.

In view of these applications in which amplitude modulated, power-limited receivers are used, what is needed is an envelope detection circuit having improved demodulated signal fidelity and minimal power consumption requirements.

SUMMARY OF THE INVENTION

The present invention provides an envelope detection circuit which is optimized for high demodulated signal fidelity and low power consumption. The described circuitry may be employed in any system having such requirements, and has particular applicability in applications such as RFID circuitry in which minimal power consumption is required.

In a particular embodiment, the envelope detection circuit as herein described includes a signal rectifier, first and second capacitors, and first, second and third transistors. The signal rectifier includes an input port coupled to receive a modulated input signal, and an output port. The first capacitor has a first port coupled to the output port of the signal rectifier and a second port for coupling to a signal ground. The first transistor has a first port coupled to the output port of the signal rectifier, a second port for coupling to a signal ground, and a control port. The second transistor has a first port for coupling to a power supply, a second port, and a control port coupled to the output of the signal rectifier. The third transistor has a first port coupled to second port of the second transistor, a second port for coupling to a signal ground, and a control port. The second capacitor has a first port coupled to first port of the third transistor, and a second port for coupling to a signal ground.

These and other features of the invention will be better understood in view of the drawings and corresponding description as provided below.

DETAILED DESCRIPTION

As an exemplary embodiment, the envelope detection circuit of the present invention is now illustrated in terms of an RFID receiver. Those skilled in the art will appreciate that the envelope detection circuit is not limited to this particular application, but may be employed in a variety of amplitude modulated receivers in which minimal power consumption is desired.

Figure 1:
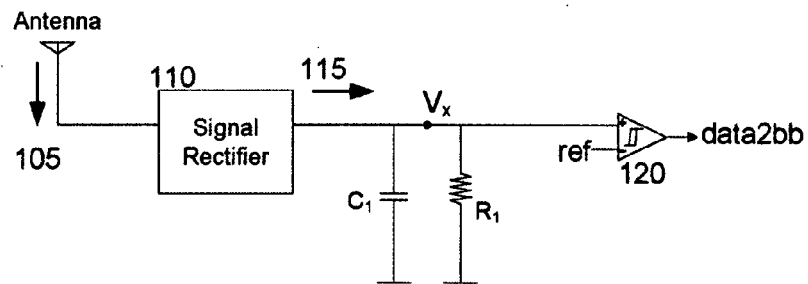
FIG. 1 illustrates an envelope detection circuit for an RFID tag known in the art
Figure 2:
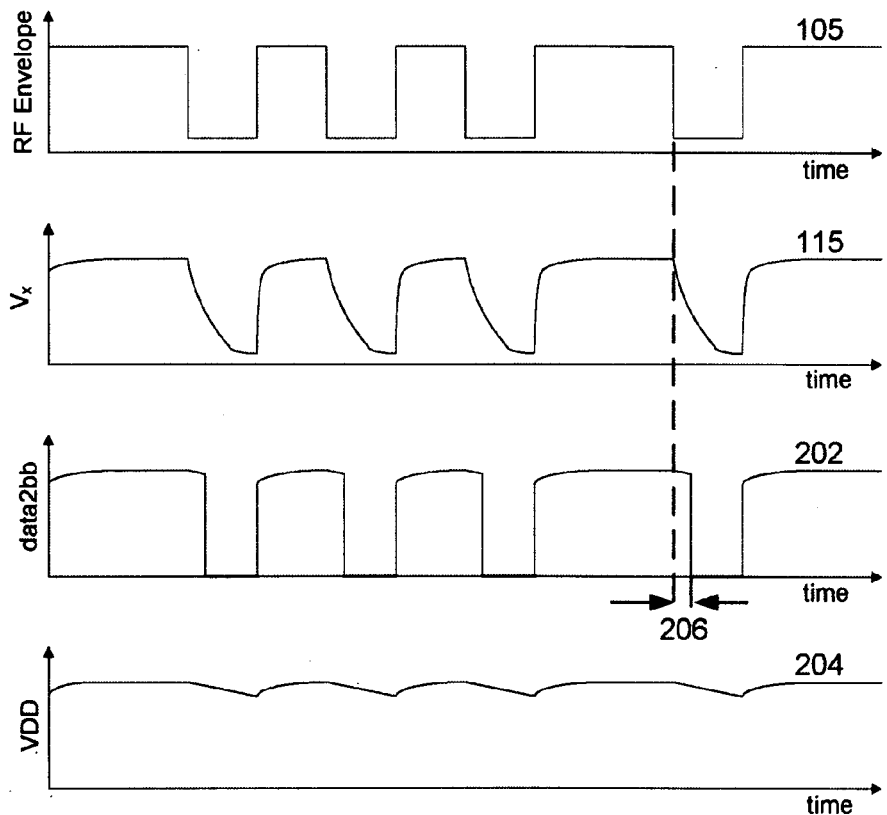
FIG. 2 illustrates signal waveforms at various nodes of the envelope detection circuit shown in FIG. 1.
Figure 3:
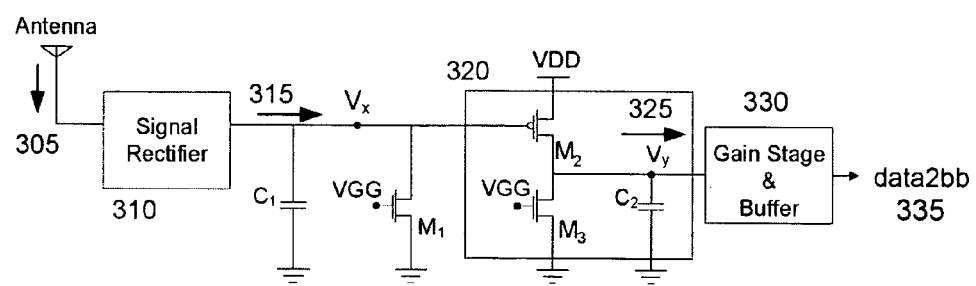
FIG. 3 illustrates an envelope detection circuit in accordance with the present invention.

FIG. 3 illustrates an envelope detection circuit in accordance with the present invention. Shown are the modulated signal 305 at the input, the rectified signal $V_x$ 315, the compensated signal $V_y$ 325, and the demodulated baseband signal data2bb 335. The envelope detection circuit includes a signal rectifier 310, first and second capacitors $C_1$ and $C_2$, and first, second and third transistors $M_1$, $M_2$, and $M_3$. The signal rectifier 310 may include one or more diodes, diode-connected transistors, or other signal rectifier means. In a particular embodiment, capacitors $C_1$ and $C_2$, and transistors $M_1$, $M_2$, and $M_3$ are monolithically formed as an integrated circuit on a semiconductor substrate such as silicon, gallium arsenide, silicon germanium, and the like. In such an embodiment, the IC is fabricated using semiconductor processing techniques appropriate for the particular material used, a few examples being standard and bipolar complementary metal oxide semiconductor processing techniques (CMOS and BiCMOS). Alternatively, as those skilled in the art will appreciate, the circuit may be formed either from discrete components, or from a combination of integrated and discrete components as well. Further, transistors $M_1$, $M_2$ and $M_3$ may be field effect transistors, bipolar junction transistors, or any functionally equivalent structure suitable for use at the desired frequency of operation.

As shown, first transistor $M_1$ (an NMOS FET in the exemplary embodiment) replaces resistor $R_1$ in the prior art circuit 100. Second and third transistors $M_2$ and $M_3$ (a PMOS and NMOS FET in the exemplary embodiment) form an inverter 320 with supply from VDD, for which third transistor $M_3$ functions as the current sink load. For supply voltage as low as 0.5V, second transistor $M_2$ is configured to work in sub-threshold mode with an intrinsic trip point approximately equal to VDD minus its threshold voltage $V_{THP}$. In a particular embodiment, first and second transistors $M_1$ and $M_3$ are matched current mirror pairs having gate terminals VGG, each of which receive a control signal established through a common reference (not shown), e.g. by a proportional to absolute temperature (PTAT) current reference circuit. In the preferred embodiment, the gate terminals VGG are switchably connected either to the PTAT or to a ground potential, depending upon the receiving mode of operation. The gate terminals VGG are connected to PTAT during both a "listening mode" in which an incoming signal is expected but not yet detected, and a "demodulation mode" in which the input signal is presently detected. During an "idle mode" in which no input signal is expected or the transceiver is performing a transmit operation, gate terminals VGG are connected to ground potential, thereby turning off transistors $M_1$ and $M_3$ to conserve current drawn.

In a particular embodiment VDD is provided by means of a charge stored in a power supply capacitor (not shown). In one embodiment, the power supply capacitor may be charged using the circuit structure of the signal rectifier 310, or alternatively a separate rectifying structure, or further alternatively, an extension of the signal rectifier 310, in which additional circuit components (e.g., additional diodes) are used to provide the charging signal. In other application of the present invention in which a battery or other power source is used, the supply signal VDD may be obtained directly therefrom.

Second capacitor $C_2$ provides capacitive loading of the current sink inverter 320. Rise time of the inverter 320 is set by $M_2$ and $C_2$ while the fall time is set by $M_3$ and $C_2$. If the transistor size of $M_2$ is set at much larger than $M_3$, e.g. at least 4 times larger, the inverter 320 enjoys negligible rise time which tracks the falling input of the rectified signal $V_x$ 315 faithfully. Additionally, the fall time of the inverter 320 is dominated by the discharging path formed by $M_3$ and $C_2$ in a way similar to the discharging mechanism of $M_1$ and $C_1$. Furthermore, ratiometric techniques may be used to achieve the desired rise and fall times, as precise capacitance and transistor design parameters cannot be expected due to semiconductor process variations or variations in environment or operational conditions. In a particular embodiment, transistor aspect ratios of $M_1$ to $M_3$ (i.e.

$$\frac{M_1}{M_3} = \frac{W_1/L_1}{W_3/L_3}$$

where W, L are the transistor's width & length respectively) and the ratio of capacitances $C_2$ to $C_1$ can be selected to provide the desired fall time compensation for $V_x$ without increasing current drain at $V_x$. By choosing $$\frac{M_1}{M_3} \approx \frac{C_1}{C_2},$$

symmetry between rise and fall characteristics can be achieved at $V_y$. The ratio of $M_1/M_3$ to $C_1/C_2$ can also be adjusted to take into account of the parasitic capacitance arising from interconnects, transistor input/output parasitic capacitances, effect of finite rise/fall time at the input 305, and the finite rise time of the inverter 320. For example, when $$\frac{M_1}{M_3} > \frac{C_1}{C_2},$$

then $V_y$ rise time<fall time. Alternatively, when $$\frac{M_1}{M_3} < \frac{C_1}{C_2},$$

then $V_y$ rise time>fall time. Accordingly, by selecting the proper individual ratios of $$\frac{M_1}{M_3} \text{ and } \frac{C_1}{C_2},$$

and the relationship between these two ratios, the desired rise/fall time profile for $V_y$ can be achieved. Optionally, a signal gain/buffer stage 330 can be used to provide additional gain, impedance matching, or otherwise condition the signal for subsequent processing.

Figure 4:
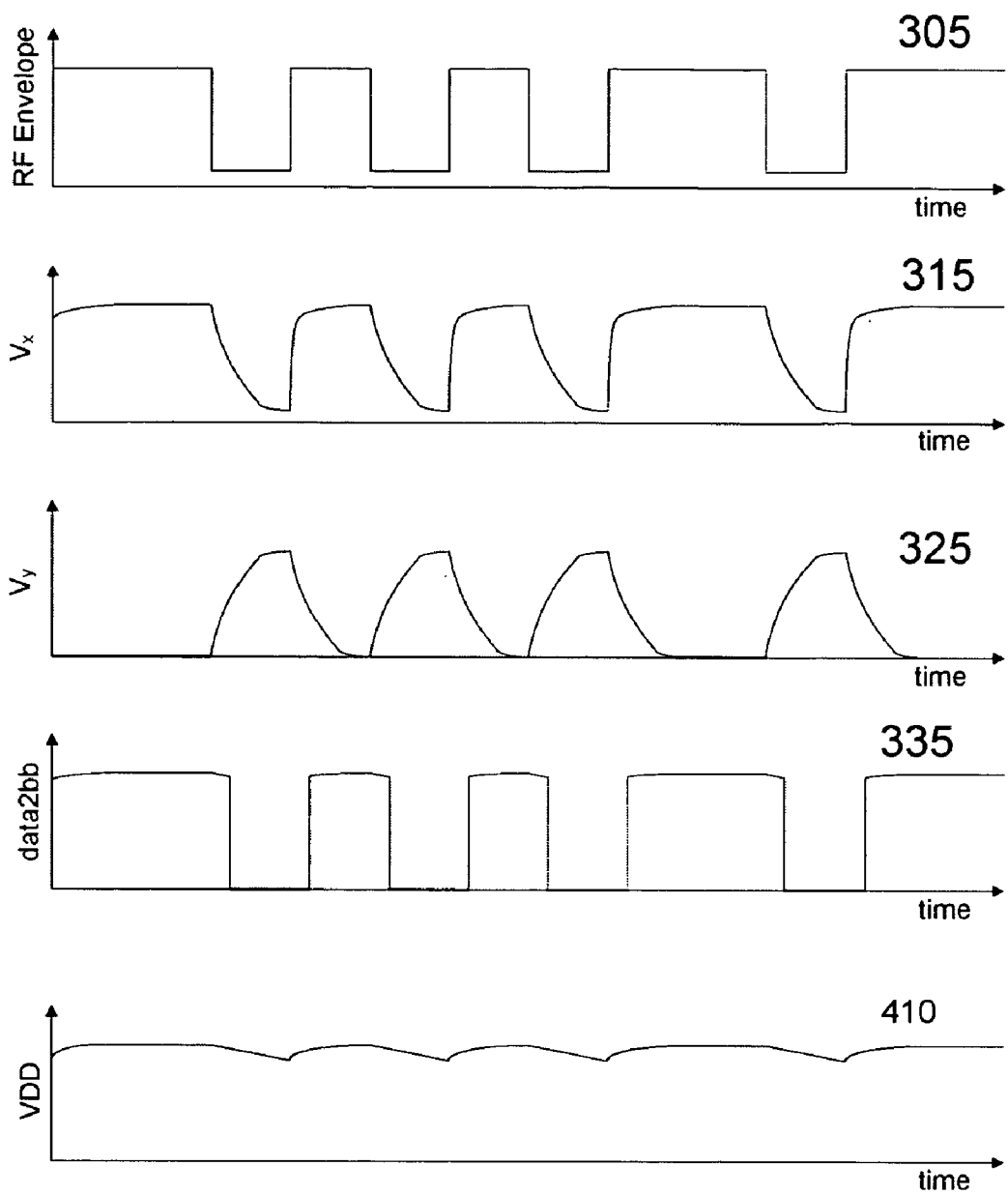
FIG. 4 illustrates signal waveforms at various nodes of the envelope detection circuit shown in FIG. 3.

FIG. 4 illustrates signal waveforms at various nodes of the envelope detection circuit 300 shown in FIG. 3. Shown are the envelope of the modulated signal 305 at the input, the demodulated input signal $V_x$ 315, the compensated signal $V_y$ 325, the baseband signal data2bbb 335, and power supply signal VDD 410. Signal $V_x$ is the demodulated waveform output from the signal rectifier 310. Signal $V_y$ is the compensated version of $V_x$, with falling edge of $V_x$ being inverted and reproduced as the rising edge of $V_y$, rising edge of $V_x$ being delayed and inverted as the falling edge of $V_y$. The symmetry of rising edge and falling edge is restored at $V_y$. Binary signal data2bb 335 is obtainable by reversing the polarity of $V_y$ with additional gain & buffer stages. In its simplest form, the gain stage & buffer 330 can be a simple inverter implemented in CMOS logic gate.

EXEMPLARY EMBODIMENT

In an exemplary embodiment of the invention, the envelope detection circuit 300 is monolithically formed on an integrated circuit using 0.13 μm standard CMOS semiconductor processing techniques. First and second capacitors $C_1$ and $C_2$ are 1800 and 80 fF capacitors, respectively. Aspect ratios for the first and third transistors $M_1$ and $M_3$ are 120 μm/0.6 μm and 4 μm/0.6 μm respectively. Second transistor $M_2$ has an aspect ratio of 16 μm/0.3 μm. The rectified VDD is 0.5 V, and $M_1/M_3$ is designed to be slightly larger than $C_1/C_2$ to take into account the finite rise time of the inverter 320. With such circuit parameters, the original signal duty cycle is fully recovered. DC power consumption is less than 30 nW with 200 kbps OOK modulated signal (75% Duty Ratio) at 2.45 GHz carrier frequency.

INCORPORATED REFERENCES

The following references are herein incorporated by reference in their entirety for all purposes:
D. Friedman, H. Heinrich & D-W. Duan, "A Low-Power CMOS Integrated for Field-Powered Radio Frequency Identification Tags," ISSCC, pp. 294~295, 1997; and
Udo Karthaus and Martin Fischer, "Fully Integrated Passive UHF RFID Transponder IC With 16.7-μW Minimum RF Input Power," *IEEE J. Solid-State Circuits*, vol. 38, pp. 1602~1608, October 2003.

While the above is a detailed description of the present invention, it is only exemplary and various modifications, alterations and equivalents may be employed in various apparti and processes described herein. For example, the described envelope detection circuit can be employed in any amplitude modulated receiver in which low power consumption is desired. Accordingly, the scope of the present invention is hereby defined by the metes and bounds of the following claims.

What is claimed is:

1. An envelope detection circuit, comprising:
   a signal rectifier having an input port configured to receive an amplitude modulated input signal, and an output port;
   a first capacitor having a first port coupled to the output port of the signal rectifier and a second port for coupling to a signal ground;
   a first transistor having a first port coupled to the output port of the signal rectifier, a second port for coupling to a signal ground, and a control port;
   a second transistor having a first port for coupling to a power supply, a second port, and a control port coupled to the output of the signal rectifier;
   a third transistor having a first port coupled to the second port of the second transistor, a second port for coupling to a signal ground, and a control port; and
   a second capacitor having a first port coupled to first port of the third transistor, and a second port for coupling to a signal ground.

2. The envelope detection circuit of claim 1, wherein the aspect ratio of the second transistor is a factor of four or higher than the aspect ratio of the third transistor.

3. The envelope detection circuit of claim 1, wherein the transistor parameters of the first and third transistors are substantially matched.

4. The envelope detection circuit of claim 1, further comprising a signal gain/buffer stage having an input coupled to output of the inverter circuit and an output.

5. The envelope detection circuit of claim 1, wherein the aspect ratios of the first and third transistors are substantially a predefined ratio.

6. The envelope detection circuit of claim 5, wherein the capacitance values of the first and second capacitors are substantially a predefined ratio.

7. The envelope detection circuit of claim 1, wherein:
   the first transistor comprises an NMOS transistor in which the first port is a drain terminal, the second port is a source terminal, and the control port is a gate terminal;
   the second transistor comprises a PMOS transistor in which the first port is a source terminal, the second port is a drain terminal, and the control port is a gate terminal;
   the third transistor comprises a NMOS transistor in which the first port is a drain terminal, the second port is a source terminal, and the control port is a gate terminal; and
   the source terminal of the second transistor is for connecting to a positive DC supply voltage, and the signal grounds comprise a ground DC potential.

8. The envelope detection circuit of claim 1, wherein the control ports of the first and second transistors are coupled to a common reference circuit.

9. The envelope detection circuit of claim 8, wherein the common reference circuit comprises a proportional-to-absolute-temperature current circuit.

10. The envelope detection circuit of claim 8, wherein the control ports of the first and second transistors are coupled to a ground potential.

11. The envelope detection circuit of claim 1, wherein the first and second capacitors and the first, second and third transistors are fabricated on an integrated circuit.

12. The envelope detection circuit of claim 11, wherein the integrated circuit is fabricated using complementary metal oxide semiconductor processing techniques.

13. The envelope detection circuit of claim 11, wherein the integrated circuit is fabricated using bipolar complementary metal oxide semiconductor processing techniques.

14. The envelope detection circuit of claim 11, wherein the integrated circuit is fabricated using silicon, gallium arsenide, or silicon germanium semiconductor material.

15. An envelope detection circuit for demodulating an on-off keyed/amplitude shift keyed signal in a radio frequency identification receiver, the envelope detection circuit comprising:
a signal rectifier having an input port coupled to receive the amplitude modulated signal, and an output port;
a first capacitor having a first port coupled to the output port of the signal rectifier and a second port coupled to a signal ground;
a first transistor having a first port coupled to the output port of the signal rectifier, a second port coupled to a signal ground, and a control port;
a second transistor having a first port coupled to a power supply, a second port, and a control port coupled to the output of the signal rectifier;
a third transistor having a first port coupled to the second port of the second transistor, a second port coupled to a signal ground, and a control port; and
a second capacitor having a first port coupled to first port of the third transistor, and a second port coupled to a signal ground.

16. The envelope detection circuit of claim 15, wherein the aspect ratio of the second transistor is a factor of four or higher than the aspect ratio of the third transistor.

17. The envelope detection circuit of claim 15, wherein the transistor parameters of the first and third transistors are substantially matched.

18. The envelope detection circuit of claim 15, further comprising a signal gain/buffer stage having an input coupled to output of the inverter circuit and an output.

19. The envelope detection circuit of claim 15, wherein the aspect ratios of the first and third transistors are substantially a predefined ratio.

20. The envelope detection circuit of claim 19, wherein the capacitance values of the first and second capacitors are substantially a predefined ratio.

21. The envelope detection circuit of claim 15, wherein:
the first transistor comprises an NMOS transistor in which the first port is a drain terminal, the second port is a source terminal, and the control port is a gate terminal;
the second transistor comprises a PMOS transistor in which the first port is a source terminal, the second port is a drain terminal, and the control port is a gate terminal;
the third transistor comprises a NMOS transistor in which the first port is a drain terminal, the second port is a source terminal, and the control port is a gate terminal; and
the source terminal of the second transistor is for connecting to a positive DC supply voltage, and the signal grounds comprise a ground DC potential.

22. An envelope detection circuit, comprising:
signal rectifier means for receiving an amplitude modulated input signal, and to produce a demodulated signal;
a first capacitor having a first port coupled to the output port of the signal rectifier means and a second port for coupling to a signal ground;
a first transistor means having a first port coupled to the output port of the signal rectifier means, a second port for coupling to a signal ground, and a control port;
a second transistor means having a first port for coupling to a power supply, a second port, and a control port coupled to the output of the signal rectifier;
a third transistor means having a first port coupled to the second port of the second transistor means, a second port for coupling to a signal ground, and a control port; and
a second capacitor having a first port coupled to first port of the third transistor means, and a second port for coupling to a signal ground.

* * * * *